United States Patent [19]

Filippi

[11] 4,008,937
[45] Feb. 22, 1977

[54] COUPLING ASSEMBLY
[75] Inventor: Ernest A. Filippi, Englewood, Colo.
[73] Assignee: Stanley Aviation Corporation, Denver, Colo.
[22] Filed: Sept. 20, 1974
[21] Appl. No.: 507,686
[52] U.S. Cl. .................................. 339/15; 24/270; 174/78; 174/94 S; 285/233; 285/373; 285/409
[51] Int. Cl.² .................. H01R 3/04; F16L 21/02; F16L 21/06
[58] Field of Search ............ 285/233, 87, 364, 365, 285/373, 409; 24/270, 271, 69 R, 69 ST, 69 CT, 69 AT, 69 SK; 174/78, 84 S, 88 S, 94 S, 35 C, 47; 339/13, 251, 14 R, 14 L, 258 A, 256 S, 258 S, 15, 16 R; 317/2 J; 403/309, 313, 344

[56] References Cited
UNITED STATES PATENTS 3,891,291  6/1975  Nadsady .......................... 174/78 X

FOREIGN PATENTS OR APPLICATIONS 660,581  4/1963  Canada ................................. 174/78
588,072  5/1947  United Kingdom ................. 174/78

*Primary Examiner*—Laramie E. Askin
*Attorney, Agent, or Firm*—Strauch, Nolan, Neale, Nies & Kurz

[57] ABSTRACT

A pipe or conduit coupling assembly having a pair of confronting, fluid-conveying members, a longitudinally split coupler removably circumferentially surrounding the fluid-conveying members to limit displacement of the fluid-conveying members away from each other, and at least one electrically conductive spring metal jumper mounted exteriorly on the coupler to complete an electrical circuit between the fluid-conveying members. A special retainer and toggle clamp assembly extends circumferentially around the split sections of the coupler and has a special toggle clamp which is incapable of being improperly latched to releasably secure the split sections of the coupler in place. A special safety lock is provided to prevent inadvertent release of the toggle clamp.

23 Claims, 12 Drawing Figures

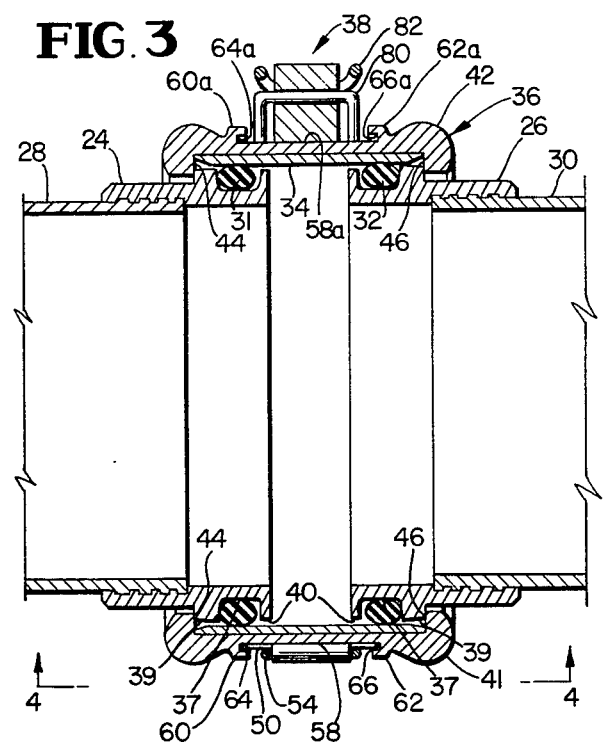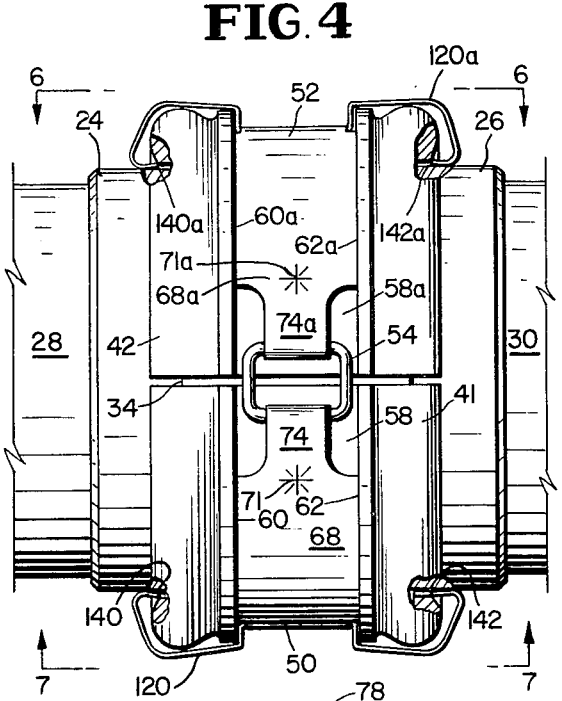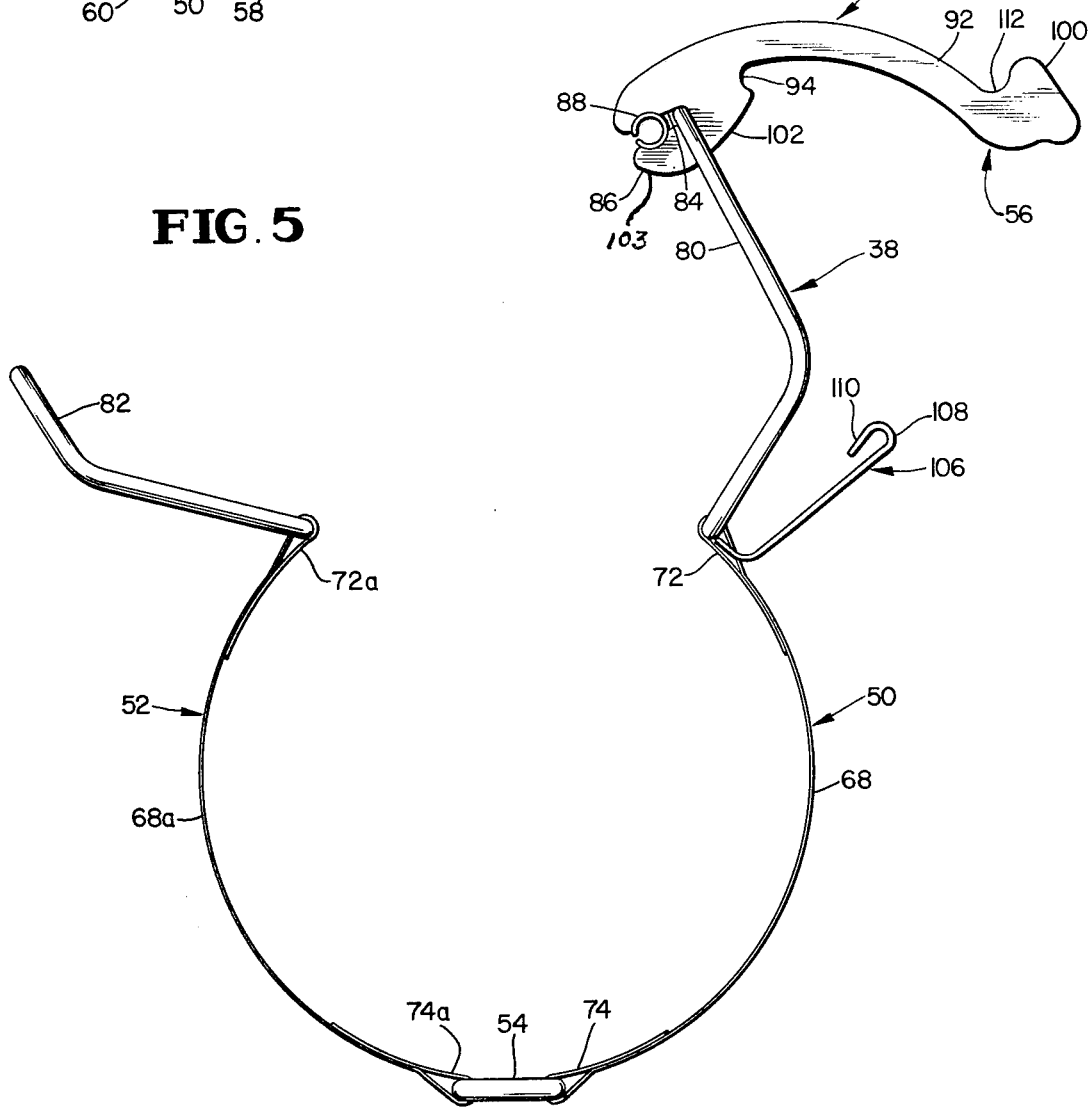

COUPLING ASSEMBLY

FIELD OF INVENTION

This invention relates to couplings for interconnecting a pair of tubular members and especially to couplings for interconnecting fluid-conveying lines. The present invention is particularly concerned with improvements in the type of flexible threadless coupling described in U.S. Pat. No. 3,776,579 which issued to E. J. Gale on Dec. 4, 1973.

BACKGROUND

Examples of other prior couplings are described in U.S. Pat. No. 2,219,161 issued to M. Jacobs on Oct. 22, 1940, U.S. Pat. No. 2,999,700 issued to F. L. Smith on Sept. 12, 1961, U.S. Pat. No. 3,499,667 issued to A. Pfeuffer on March 10, 1970, U.S. Pat. No. 1,839,761 issued to A. R. Hutton on Jan. 5, 1932, U.S. Pat. No. 3,540,758 issued to J. Torres on Nov. 17, 1970, U.S. Pat. No. 3,610,654 issued to J. Torres on Oct. 5, 1971, U.S. Pat. No. 2,913,262 issued to H. A. De Cenzo et al on Nov. 17, 1959, and U.S. Pat. No. 3,228,714 issued to L. S. Dricksen on Jan. 11, 1966.

The type of coupling described in No. Pat. No. 3,776,579 is not satisfactory for interconnecting lines which convey jet fuel or other readily ionizable fluids because the coupling's deformable seal rings may electrically insulate the coupled sections of the line from each other. When this condition occurs, ionization of the jet fuel in the line may cause an electrostatic charge to build up on one of the coupled sections of the line. The stored charge gives rise to the hazard of electrical spark in the presence of vaporized fuel should it be discharged by grounding or by flexing the coupling in such a manner as to bring metallic parts of the coupling into contact with each other.

Various types of electrical jumpers (which are customarily referred to as bonding jumpers) have been proposed in the past to avoid this hazard. The bonding jumpers provide an electrically conductive metallic connection between the coupled sections of the line to prevent a potential or charge from building up on one of the coupled sections of the line relative to the other.

Prior to this invention exteriorly and interiorly mounted jumpers have been proposed for electrically interconnecting coupled sections of a fluid-conveying line.

External electrical jumpers customarily comprise a strip of usually flexible metal or a section of cable which is detachably secured by fasteners to the coupled ends of the fluid-conveying line or to flanges which are fixed to the adjacent ends of the coupled sections of the line. One example of an exteriorly mounted electrical jumper is described in U.S. Pat. No. 3,152,220 which issued to A. F. Gallacher on Oct. 6, 1964.

Exteriorly mounted electrical jumpers of the type described above are not satisfactory because they require assembly and disassembly each time it is desired to couple and uncouple the sections of the fluid-conveying line.

It has also been proposed to utilize a generally U-shaped spring clip jumper which is exteriorly clipped on a coupling and which has gripping legs yieldably engaging the coupling. This type of jumper also requires removal to uncouple the line. Additionally, the gripping legs of the spring clip are frequently bent permanently out of shape when they are grasped to spread them apart for removing the clip from the coupling and also for mounting the clip on the coupling.

Prior bonding jumpers which are mounted interiorly within the coupling may take the form of a leaf spring which is arranged to seat against and establish electrical continuity between the flanges on adjacent ends of the coupled sections of the fluid-conveying line. Also, metallic washers are sometimes interposed between adjacent flanged ends of fluid-conveying lines to establish an electrical circuit between the coupled ends of the line as shown, for example, in U.S. Pat. No. 2,407,076 which issued on Sept. 3, 1946 to J. R. Harkness and U.S. Pat. No. 2,783,297 which issued to L. M. Ewing on Feb. 26, 1957.

Bonding jumpers which are mounted interiorly of the coupling are disadvantageous because they cannot be seen from the exterior of the coupling. It therefore is not possible to determine whether the bonding jumper is mounted in place without disassembling the coupling itself.

The type of threadless coupling described in the U.S. Pat. No. 3,776,579 comprises a longitudinally split coupler which is releasably retained by a flexible clamping band in a coupling position around confronting flanges on the adjacent ends of the coupled sections of the fluid-conveying line. The clamping band, which is looped around the split coupler, has interengageable ends to circumferentially confine the coupler halves in their coupling positions on the flanges.

Toggle clamps or locks are generally easier to manipulate than the type of retaining or clamping band latch described in U.S. Pat. No. 3,776,579. However, various toggle clamps, which heretofore have been proposed for securing the ends of a clamping or retaining band in a coupling, can be latched improperly to result in leakage or release of the coupling. Additionally, known prior toggle latching arrangements which are suitable for clamping a retaining band in a coupling provide no safety lock to maintain the toggle clamp in its locking position.

Examples of prior toggle locks are described in the previously mentioned U.S. Pat. Nos. 3,228,714 and 2,913,262 and also in U.S. Pat. No. 3,333,302 which issued to R. Klima on Aug. 1, 1967.

In the coupling described in U.S. Pat. No. 3,776,579 the clamping band is fixed to the separately formed halves of the split coupler and bridges adjacent ends of the coupling halves to provide a yieldable hinge which allows the split coupler to be opened and closed for assembly and disassembly on the coupling flanges. This construction is disadvantageous because workers, in assembling or disassembling the coupling, sometimes spread the coupler halves so far apart that they permanently deform the clamping band in the yieldable hinge region which bridges the adjacent ends of the coupler halves.

SUMMARY AND OBJECTS OF INVENTION

One of the major objects of this invention is to provide a novel coupling assembly which overcomes the foregoing shortcomings.

More particularly, one of the objects of this invention is to provide a coupling with a novel exteriorly mounted electrical jumper for electrically interconnecting the coupled sections of a fluid-conveying line.

The electrical jumper of this invention is in the form of a spring metal member which is exteriorly mounted on the removable coupler of the coupling assembly and which is not directly attached to the coupled sections of the line. With this arrangement, the electrical jumper of this invention does not require removal from the coupler or any handling whatever in order to uncouple or couple sections of the fluid-conveying line.

Additionally, the jumper of this invention is constructed and positioned on the coupler in such a manner to make it difficult for a person to grasp and permanently deform the jumper's extremities which make electrical contact with the coupled fluid-conveying members.

Furthermore, the bonding jumper of this invention is of simplified construction, is easily assembled with the other parts of the removable coupler and is inexpensive to manufacture.

Accordingly, a more specific object of this invention is to provide a novel combined coupling and jumper assembly in which an electrical jumper is not directly attached to the coupled sections of the line and does not require removal from the coupler to uncouple the coupled sections of the line.

Another important object of this invention is to provide a novel combined coupling and jumper assembly in which an electrical bonding jumper does not interfere with the assembly and disassembly of a coupler for coupling and uncoupling sections of a fluid-conveying line.

Still another object of this invention is to provide a novel coupling and jumper assembly in which an exterior electrical clip jumper is mounted in such a manner as to make it difficult to reversely bend the jumper.

In the preferred embodiment of this invention the removable coupler mentioned above couples together a pair of confronting, fluid-conveying tubular members and is longitudinally divided into a pair of separately formed coupling halves. The coupling halves extend circumferentially around a seal ring-engaging sleeve bridging the confronting fluid-conveying members, and seal rings are deformed between the sleeve and the fluid-conveying members.

The coupling halves mentioned above are releasably held circumferentially in place by a novel combined retainer and toggle clamp assembly extending circumferentially around the coupling halves. This assembly includes a retaining structure extending partially around the split coupler and a novel toggle clamp or latch. The toggle clamp releasably secures the circumferential extremities of the retaining structure together.

In accordance with this invention, the toggle clamp is constructed so that is cannot be improperly latched by a worker in such a manner that the coupling halves are loosely held on the seal ring-engaging sleeve mentioned above. As a result, the toggle clamp cannot be latched in a manner to cause leakage or release of the coupling as is possible with known prior toggle clamps.

Accordingly, another important object of this invention is to provide a novel coupling assembly in which a toggle clamp is so constructed that it cannot be incorrectly latched in such a manner as to loosely confine the halves of the split coupler in their coupling positions.

According to another novel feature of this invention the toggle clamp of this invention has an additional safety lock which releasably locks the toggle clamping lever in its clamping or latching position. In the preferred embodiment the safety lock comprises a clasp which is secured to the retaining structure and which is enagageable with the catch on the toggle lever to prevent the toggle lever from being inadvertently pivoted away from its latching position.

With the foregoing in mind, another important object of this invention is to provide a coupling assembly with a novel toggle clamp which has a safety lock for retaining the toggle-clamping lever in its latching position.

In the illustrated embodiment of this invention, the retaining structure mentioned above comprises a pair of retaining bands which are pivotally interconnected by a hinge ring. The retaining bands are confined one on each of the coupling halves so that the coupling halves are secured together through the pivotal connection which is provided by the hinge ring. With this two-piece retaining band and hinge arrangement permanent deformation of the retaining bands cannot occur when the free ends of the coupling halves are spread circumferentially apart.

In this invention the coupling halves may advantageously be formed with spaced apart band-retaining lips which overlie the marginal side edges of the retaining bands to confine the bands on the coupling halves.

Accordingly, another object of this invention is to provide a novel coupling in which a retaining band assembly extends circumferentially around a longitudinally split coupler to circumferentially confine the separate halves of the split coupler and in which each of the split coupler halves is integrally formed with a structure for confining the bands of the retaining band assembly on the coupler.

The mounting of the electrical jumper of this invention is uniquely simplified by capturing it between one of the retaining bands mentioned above and the exterior of the coupling half on which the band is mounted. With this novel arrangement, the manufacture of the coupling is simplified, and no separate fasteners are required for securing the electrical jumper to the coupling half. Additionally, two or more jumpers may be mounted on the split coupler in this invention to increase the reliability of the electrical connection between coupled sections of a line.

Further objects of this invention will appear as the description proceeds in connection with the appended claims and below-described drawings.

DESCRIPTION OF DRAWINGS

FIG. 3 is a longitudinal section taken substantially along lines 3—3 of FIG. 1;

FIG. 4 is a side elevation of the coupling assembly shown in FIG. 1;

FIG. 5 is an end elevation of the combined retaining band and toggle lock assembly shown in FIG. 1;

DETAILED DESCRIPTION

Figure 1:
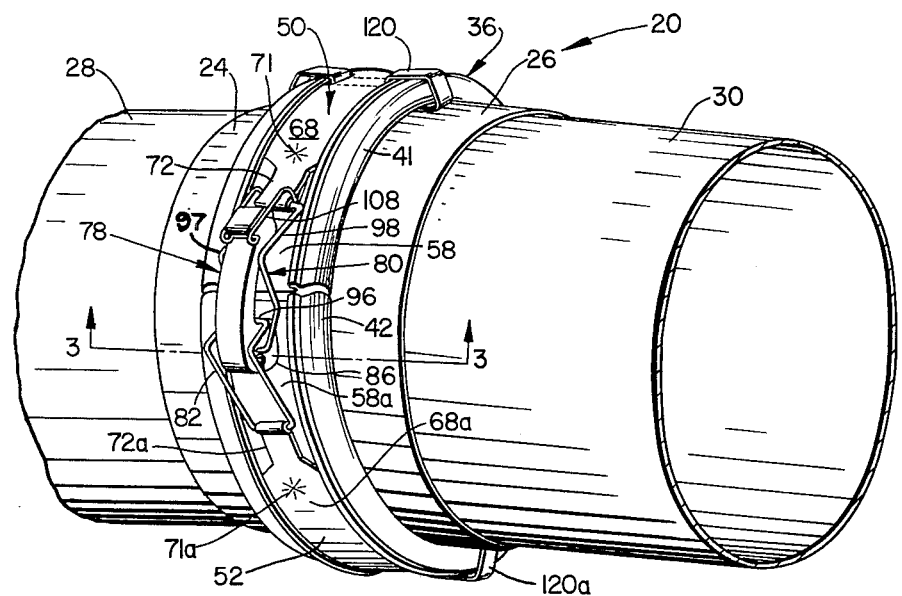
FIG. 1 is a perspective view of a coupling assembly which incorporates the principles of this invention for coupling a pair of tubular members together.
Figure 2:
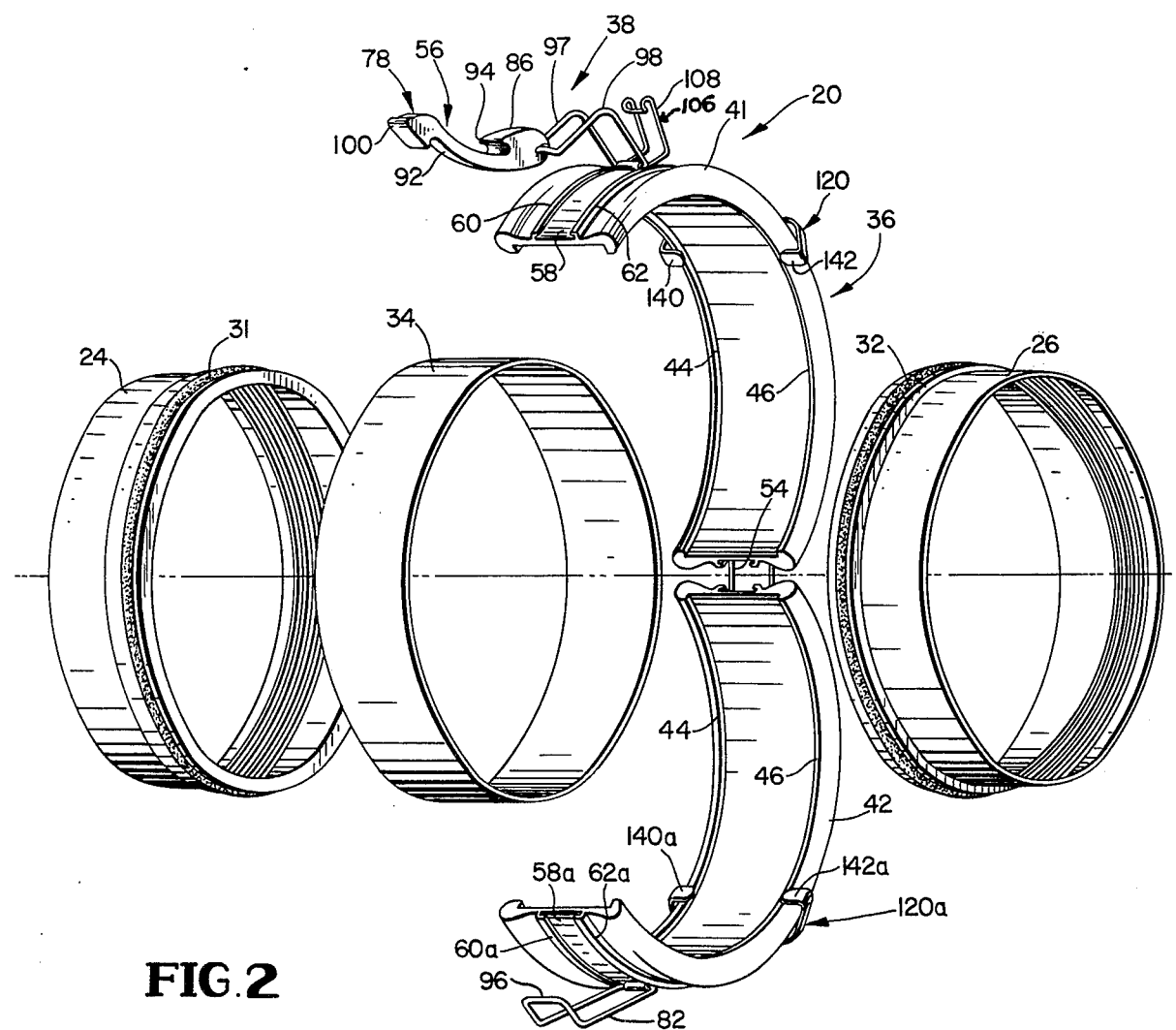
FIG. 2 is an exploded perspective view of the coupling assembly shown in FIG. 1.

Referring to the drawings and particularly to FIGS. 1–3, the threadless, flexible coupling assembly incorporating the principles of this invention is generally indicated at 20 and comprises a pair of flanged, confronting fluid-conveying members 24 and 26 of tubular configuration. Members 24 and 26 are rigidly fixed to the ends of tubular fluid-conveying conduits 28 and 30 respectively as shown in FIG. 3.

Conduits 28 and 30 may be utilized to convey fluids under pressure. Members 24 and 26 may be coaxially swaged on the ends of conduits 28 and 30 as shown.

As shown in FIGS. 1–3, coupling assembly 20 further includes a pair of resilient sealing rings 31 and 32, a seal ring-retaining sleeve 34, a longitudinally split annular coupler 36, and a retaining band and toggle lock assembly 38. Seal rings 31 and 32 may be formed from any suitable elastically deformable material.

Members 24 and 26 may be of the same construction as those described in the previously identified U.S. Pat. No. 3,776,579. As shown, each of the members 24 and 26 has a radially outward opening annular groove 37 which receives one of the seal rings 31 and 32 and which is defined by a pair of axially spaced apart, annular, radially extending shoulders or flanges 39 and 40.

As best shown in FIG. 3, sleeve 34 axially bridges or spans the space between the opposed end faces of members 24 and 26 and peripherally surrounds and seats against seal rings 31 and 32. Grooves 37 are sufficiently shallow so that the outer peripheral portions of seal rings 31 and 32 protrude radially beyond the groove-defining shoulders of members 24 and 26 and are consequently deformed against the smooth, cylindrical inner periphery of sleeve 34. In this manner, ring 31 establishes a fluid-tight seal between member 24 and sleeve 34, and ring 32 establishes a fluid-tight seal between member 26 and sleeve 34.

Sleeve 34 may be of the same construction as the seal ring-engaging sleeve in the coupling described in U.S. Pat. No. 3,776,579 except that the outer periphery of sleeve 34 is preferably roughened in a suitable manner to enable a person to grip the sleeve more firmly in the course of assembling sleeve 34 on members 24 and 26. For example, the outer peripheral surface of sleeve 34 may be roughened by sand blasting. Alternatively, the outer peripheral surface of sleeve 34 may be provided with corrugations to provide the desired rough gripping surface which keeps the sleeve from slipping in the workman's hand as he forces the sleeve over seal rings 31 and 32. With this construction, sleeve 34 is more easily assembled on members 24 and 26.

Member 24 may be positioned so that its axis axially aligns with the axis of sleeve 34 or it may selectively be angulated or angularly deflected relative to sleeve 34 so that its axis transversely intersects the axis of sleeve 34. Similarly, member 26 may be positioned so that its axis axially aligns with the axis of sleeve 34, or it may selectively be angulated or angularly deflected so that its axis transversely intersects the axis of sleeve 34.

As best shown in FIGS. 1, 2, and 4 coupler 36 peripherally surrounds sleeve 34 and is longitudinally divided along a radial plane into two complemental separately formed coupling halves 41 and 42. Each of the coupler halves 41 and 42 arcuately extends substantially 180° around sleeve 34 and seats against the periphery of sleeve 34. As will be described in detail shortly, the retaining band and toggle lock assembly 38 releasably secures coupling halves 41 and 42 together in assembled relation circumferentially around sleeve 34.

Each of the coupler halves 41 and 42 is formed with axially spaced apart radially inwardly extending shoulders or flanges 44 and 46. In assembled relation, the shoulders 39 of members 24 and 26 are disposed axially between the shoulders 44 and 46 on coupling halves 41 and 42 so that shoulders 39 are axially abuttable with shoulders 44 and 46 to limit relative axial displacement of members 24 and 26 away from each other.

When fluid under pressure is conveyed through conduits 20 and 30, the pressure of the fluid will be applied to the axially opposed end faces of members 24 and 26 tending to urge members 24 and 26 axially apart. This relative axial movement will be limited by abuttment of shoulders 39 with shoulders 44 and 46.

Fluid under pressure will also pass between sleeve 34 and shoulders 40 to further deform seal rings 31 and 32. Thus, as the fluid pressure increases, the seal-establishing deformation of rings 31 and 32 increases. Members 24 and 26 absorb the axial loading which results from internal fluid pressure.

Sleeve 34 is positioned axially between shoulders 44 and 46 on coupler halves 41 and 42 so that axial movement of sleeve 34 is confined by abutment with shoulders 44 in one direction and by abutment with shoulders 46 in the other direction. The axial spacing between shoulders 44 and 46 and the axial length of sleeve 34 is such that for any positions of sleeve 34 and members 24 and 26, sleeve 34 will be sealing engagement with seal rings 31 and 32.

Referring to FIG. 5, the retaining band and toggle lock assembly 38 comprises a pair of flat-sided flexible spring metal retaining bands 50 and 52, a hinge 54 for bands 50 and 52 and a toggle clamp assembly 56.

Referring to FIGS. 1–4, retaining band 50 seats against a cylindrically smooth, uniformly diametered outer peripheral surface 58 on coupling half 41. Band 50 extends partially around coupling half 41 and is retained on coupling half 41 by a pair of exterior, circumferentially extending axially spaced apart retaining lips 60 and 62 which are integral with coupling half 41.

Lips 60 and 62 project axially toward each other and overlie the peripheral surface 58 to define opposed, axially opening circumferentially extending grooves 64 and 66. Lips 60 and 62 are continuous, coextensive and extend from one end of the coupler half to the other.

Retaining band 50 has an elongated body portion 68 of uniform width which is significantly greater than the axial spacing between lips 60 and 62 so that the marginal side edges of body portion 68 are seated in grooves 64 and 66 and underlie lips 60 and 62. With this construction, lips 60 and 62 confine retaining band 50 against axial and radial displacement on coupling half 41. Lips 60 and 62 may be crimped or staked at circumferentially spaced apart regions which are indicated at 70 in FIG. 7 to confine retaining band 50 against circumferential movement on coupling half 41. Additionally or alternatively, band 50 may be spot welded to coupling half 41 as indicated at 71 in FIG. 1.

The end portions of retaining band 50, which are indicated at 72 and 74 in the drawings, have widths which are significantly smaller than the axial spacing between lips 60 and 62. End portions 72 and 74 lie axially between lips 60 and 62 so that they are free for flexure outwardly and away from coupling half 41.

Retaining band 50 is assembled on coupling half 41 by first aligning the opposite marginal side edges of body portion 68 with the open circumferential extremities of grooves 64 and 66 at one end of the coupler half and then by sliding the body portion 68 through grooves 64 and 66 to extend retaining band 50 circumferentially over surface 58. Lips 60 and 62 are then crimped at regions 70 to firmly secure retaining band 50 to coupling half 41.

Coupling half 42 has the same band-retaining lip construction as that just described for coupling half 41. Additionally, retaining band 52 is of the same construction as band 50 and is mounted on coupling half 42 in the same manner which was just described for the mounting of retaining band 50 on coupling half 41.

Accordingly, like reference numerals suffixed by the letter a have been applied to designate like portions of retaining band 52. Additionally, like reference numerals suffixed by the letter a have been applied to designate the corresponding lips and other portions of coupling half 42.

Figure 6:
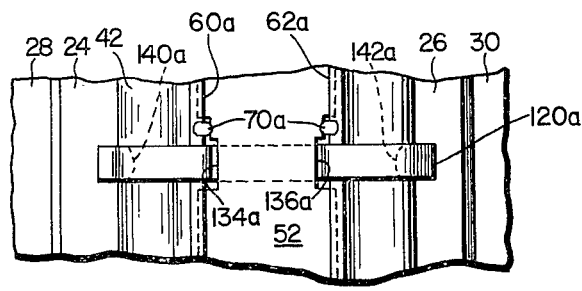
FIG. 6 is a fragmentary elevation of the coupling assembly as viewed from lines 6—6 of FIG. 4.

As shown, retaining band 52 seats against the cylindrically smooth, circumferentially extending surface 58a of coupling half 42. The marginal side edges of the retaining band's body portion 68a are seated in grooves 64a and 66a and underlie lips 60a and 62a. The crimped regions 70a (FIG. 6) of lips 60a and 62a secure retaining band 52 in place on coupling half 42. Band 52 is assembled on coupling half 42 in the same manner in which band 50 is assembled on coupling half 41. Band 52 may also be spot welded to coupling half 42 if desired. Coupling halves 41 and 42 may be formed from aluminum or other suitable ductile or crimpable material to permit lips 60, 62, 60a and 62a to be crimped at regions 70 and 70a.

As shown in FIGS. 1 and 4, each of the retaining band end portions 72, 74, 72a and 74a terminate in a loop. In this embodiment hinge 54 (see FIG. 4) is a closed chain link of rectangular configuration which has parallel spaced apart rod portions extending through the loops of the adjacent retaining band end portions 74 and 74a.

Hinge 54 bridges the adjacent ends of coupling halves 41 and 42. End portions 74 and 74a, which are interconnected by hinge 54, terminate short of the adjacent circumferential extremities of the coupler halves which are bridged by hinge 54. Thus, as the opposite circumferential extremities of coupling halves 41 and 42 are spread circumferentially apart in the manner shown in FIG. 2, end portions 74 and 74a will turn or pivot about the straight, parallel portions of hinge 54.

With this construction, therefore, neither of the retaining bands 50 and 52 can be permanently deformed or reversely bent by circumferentially spreading the ends of coupling halves 41 and 42 in the manner shown in FIG. 2. Additionally, the construction for securing retaining bands 50 and 52 to the coupling halves 41 and 42 and for pivotally interconnecting the retaining bands is simplified and economical to manufacture.

With the structure thus far described it will be appreciated that coupling halves 41 and 42 are pivotally connected together through retaining bands 50 and 52 and hinge 54 to allow the opposite ends of the coupling halves to be spread circumferentially apart for asembling the split coupler on sleeve 34 and for removing the split coupler from the coupling assembly.

Figure 8:
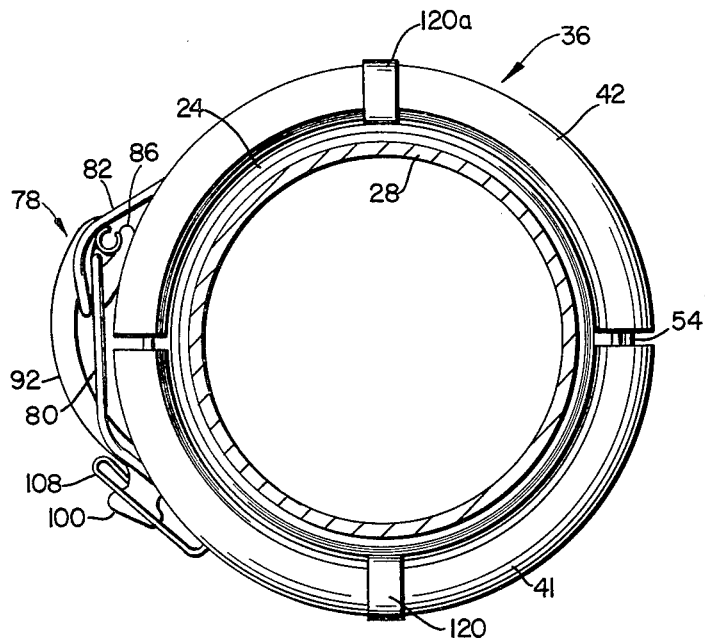
FIG. 8 is an end elevation of the coupling assembly shown in FIG. 1.

As shown in FIGS. 2, 5, and 8 toggle assembly 56 comprises a one-piece toggle lever 78, a toggle lever retainer 80, and a clasp 82. Retainer 80 connects toggle lever 78 to the end portion 72 of retainer band 50.

As shown, retainer 80 is a rectangularly configured chain link which may be welded closed and which has parallel, straight rod portions which respectively extend through the loop in the retaining band end portion 72 and through a groove 84 which is formed in an enlarged nose portion 86 of toggle lever 78.

The open end of groove 84 is closed by a tubular pin 88. Retainer 80 is confined between pin 88 and the closed inner end of groove 84. Pin 88 is seated in the mouth of groove 84 as best shown in FIG. 5 and longitudinally is split so that it is retained in place by yieldable engagement with the side walls of groove 84.

From the foregoing description it will be appreciated that retainer 80 is pivotally secured to band 50, and toggle lever 78 is pivotally secured to retainer 80. Retainer 80 is free to swing about the axis of the loop at the end of the retainer band end portion 72. Toggle lever 78 is swingable on retainer 80 about an axis which is parallel to and circumferentially spaced from the axis about which retainer 80 is swingable. The axis about which retainer 80 is swingable lies parallel with the longitudinal axis of coupler 36.

Clasp 82 also is in the form of a rectangularly configured chain link which may be welded closed and which is pivotally or swingably secured to the retainer band end portion 72a. As shown, clasp 82 has a straight rod portion which extends through the looped end of the retainer band end portion 72a so that clasp 82 is freely swingable about an axis which is parallel to the longitudinal axis of coupler 36.

As best shown in FIG. 5, toggle lever 78 is formed with a grippable shank or lever portion 92 which is integral with nose portion 86. At the juncture between the nose and lever portions 86 and 92, toggle lever 78 is undercut to form a open ended recess or groove 94. Groove 94 defines a catch for latching with clasp 82.

Groove 94 opens towards the free end of lever portion 92 which is remote from nose portion 86 and is on the underside of lever 78 when the lever is in its clamping position as shown in FIG. 1. The longitudinal axis of groove 94 lies parallel with the axis about which lever 78 is swingable on retainer 80.

In the clamping positions of the toggle assembly parts shown in FIG. 1, clasp 82 is hooked over lever portion 92 and has a straight transverse rod portion 96 which seats and catches in groove 94. Additionally, when the parts of the toggle clamping assembly are in their clamping positions, toggle lever 78 is so positioned that lever portion 92 lies between two circumferentially extending spaced apart rod portions 97 and 98 of retainer 80 as shown in FIG. 1.

In the illustrated clamping position of lever 78, the rod portion 96 of clasp 82 and groove 94 lie on the inwardly facing side of lever 78. In this position of lever 78, the free end 100 of lever portion 92 lies circumferentially between the looped end of the retaining band end portion 72 and nose portion 86 and is adjacent to the swing axis of retainer 80.

To couple members 24 and 26 together, sleeve 34 is first telescoped over members 24 and 26 to seat against and seal with seal rings 31 and 32 in the manner previously described. Then, the free uncoupled circumferential extremities of coupling halves 41 and 42 are spread circumferentially apart in the manner shown in FIG. 2 to slip coupler 36 circumferentially over sleeve 34.

Figure 9:
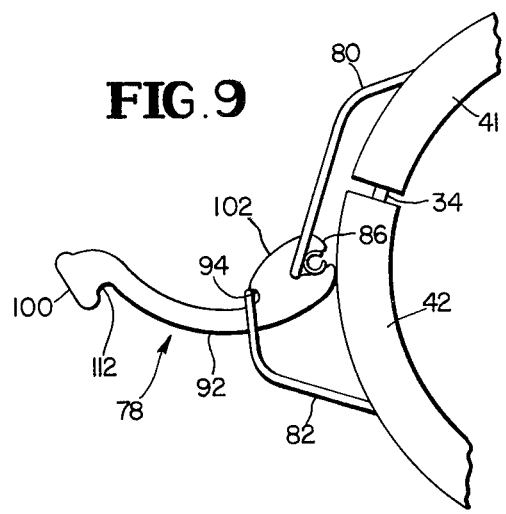
FIG. 9 is a fragmentary end elevation similar to FIG. 8 but illustrating the components of the toggle lock in their unlatched positions.

With the split coupling halves 41 and 42 in this position, clasp 82 is hooked over the free end of toggle lever 78 to a position where the rod portion 96 of clasp 82 seats and catches in groove 94 as shown in FIG. 9. Lever 78 is then swung clockwise (as viewed from FIG. 9) about retainer 80.

As lever 78 is swung in this direction to move the free lever end 100 toward the retaining band end portion 72 and away from the retaining band end portion 72a, the axis of groove 94 will move over center with respect to the pivot or swing axis of lever 78 on retainer 80 to thereby produce a force couple which results in the toggling action that urges lever 78 to the clamping position shown in FIG. 1. Thus, the adjacent extremities of coupling halves 41 and 42 will be circumferentially drawn toward each other by the tension applied through bands 50 and 52 to tightly clamp coupling halves 41 and 42 circumferentially against sleeve 34.

As best shown in FIG. 5, the underside of nose portion 86 has a smooth inclined camming surface 102 which slopes back towards groove 94 from the forward surface 103 of nose portion 86. Surfaces 102 and 103 slope in opposite directions as shown. The purpose of surface 102 is to prevent improper latching action should rod portion 96 not be properly positioned in groove 94.

Figure 10:
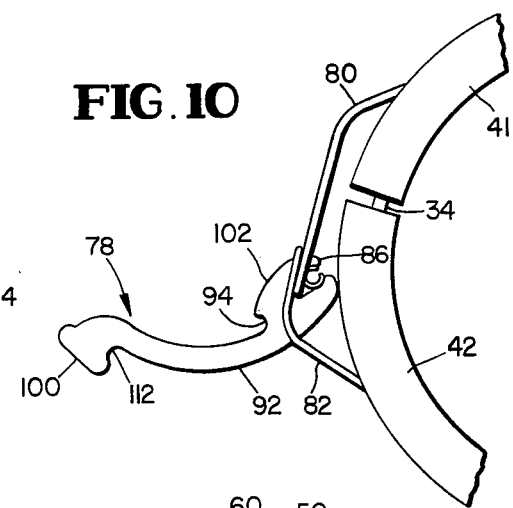
FIG. 10 is a fragmentary elevation similar to FIG. 9, but illustrating an incorrect latching position of the toggle lock clasp.

If during clamping, toggle lever 78 is passed too far through clasp 82, rod portion 96, instead of seating in groove 94, will seat on surface 102 as shown in FIG. 10. Thus, as lever 78 is swung clockwise (as viewed from FIG. 10), clasp 82 will be urged by the slope of surface 102 toward groove 94. Additionally, retainer 80 will abut clasp 82 as lever 78 is swung to its clamping position to help urge or drive clasp 82 to its position where it seats in groove 94. This relative movement of clasp 82 will continue as lever 78 is swung towards its clamping position until rod portion 96 moves over the back edge of nose portion 86 and seats properly in groove 94. Retainer 80 continues to contact and thus aid in urging clasp 82 as clasp 82 is moved relatively along surface 102 and over the back edge of nose portion 86. When clasp 82 is seated in groove 94 and lever 78 is in its clamping position as shown in FIG. 8, retainer 80 remains in contact with clasp 82 or nearly so.

Without locating groove 94 in the manner previously described and without providing for the inclined camming surface 102 on the same side of the lever with groove 94 as previously described, rod portion 96 could remain in the position shown in FIG. 10 upon swinging lever 78 to its clamping position. With rod portion 96 in this incorrect position, coupling halves 41 and 42 would not be drawn tightly together around sleeve 34 and, instead, would be loosely positioned on the sleeve. As a result, the free ends of coupling halves 41 and 42 may spread apart sufficiently to permit uncoupling of members 24 and 26 under the influence of internal fluid pressure or as a result of flexing the coupling.

This objectionable condition is avoided since clasp 82 will be urged into groove 94 by the slope of surface 102 and also by engagement with retainer 80 as lever 78 is swung from its unclamping position shown in FIG. 9 toward its clamping position shown in FIG. 1. Thus, the free ends of coupling halves 41 and 42 cannot be loosely latched together through inadvertence or error by the workman.

As shown in FIGS. 1 and 2, the circumferentially extending rod portions of clasp 82 and retainer 80 are formed with bends. This construction provides clasp 82 and retainer 80 each with a spring action so that they each are yieldably extendable in a direction extending circumferentially of the coupling assembly. The spring effect of clasp 82 and retainer 80 compensates for manufacturing tolerances or variations in the length of assembly 38 to assure proper operation of toggle clamp assembly 56 and positive latching action even though the length of assembly 38 may vary from coupling to coupling. Additionally, clasp 82 and retainer 80 are preferably slightly tensioned (i.e., yieldably extended somewhat) in the latching positions of parts shown in FIG. 1 so that clasp 82 snugly seats in groove 94 and will not slip out.

According to another feature of this invention the free end 100 of lever portion 92 is enlarged to define a catch for a safety lock 106 which is operable to positively lock lever 78 in its clamping position.

As shown in FIGS. 1, 2 and 5 safety lock 106 comprises a locking clip 108 which is positionable to cooperate with the catch defined by the enlarged lever end 100 to latch lever 78 in its clamping position. Clip 108, as best seen from FIG. 1, is in the form of a closed chain link which has a rod portion extending through the looped end of the retainer band end portion 72 along with retainer 80. Thus, locking clip 108 is pivotally secured to the retainer band end portion 72 and is swingable about an axis which is substantially parallel to the swing axis of retainer 80.

The free end of locking clip 108 is reversely bent to form a hook 110 as best shown in FIG. 5. In the locking position of clip 108, hook 110 seats and catches in a groove 112 which is formed between enlarged end 100 of lever 78 and the relatively thin shank portion of lever 78 which extends between the enlarged end 100 and nose portion 86.

As shown in FIG. 5, groove 112 is formed in the side of lever 78 which faces outwardly when lever 78 is in its locking or clamping position. Groove 112 is on the side of lever 78 opposite from groove 94.

After toggle lever 78 is swung to its clamping position shown in FIG. 1, it may be locked in its clamping position by swinging locking clip 108 to its locking position where it loops over the enlarged lever end 100 to seat hook 110 in groove 112. With clip 108 in this locking position, lever 78 is securely retained by clip 108 against movement away from its clamping position.

From the foregoing description it will be appreciated that toggle lever 78 is integrally formed with two catches on opposite sides thereof, one for clasp 82 and the other for locking clip 108.

Figure 12:
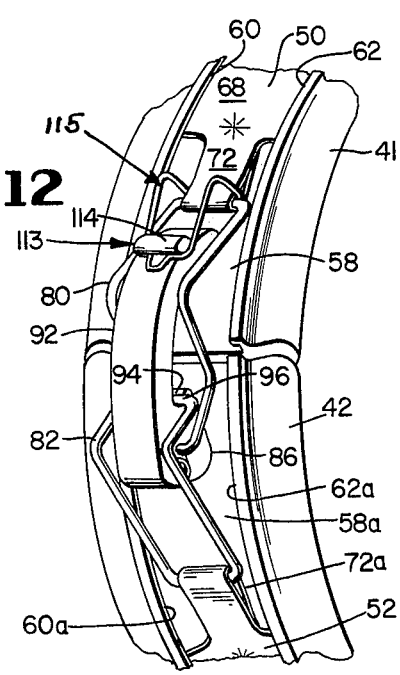
FIG. 12 is a perspective view similar to FIG. 1, but showing a modified form of a toggle lever safety lock.

Instead of enlarging the free end of lever 78 to define the catch for locking clip 108, lever 78 may be integrally formed with a projection 113 as shown in FIG. 12. Projection 113 is positioned near the free end of lever 78 and terminates in an enlarged head 114.

A modified locking clip 115, which replaces locking clip 108, is also a closed chain link and has a straight rod portion which extends through the loop in the end of the retaining band end portion 72. Clip 115 is swingable about an axis parallel to the swing axis of retainer 80. The end of clip 115 remote from the retaining band end portion 72 is configured so that it may be hooked over projection 113 to seat against the underside of the enlarged head 114 and thereby retain lever 78 in its illustrated clamping position.

In the flexible coupling thus far described, sleeve 34 may be so positioned that it does not contact either of the flanges 24 or 26. When this occurs, seal rings 31 and 32, being customarily made from electrical insulating material, will electrically insulate conduits 28 and 30 from each other. This condition is hazardous when coupling 20 is used to couple sections of a line which conveys jet fuel or other readily ionizable fluids because free ions may store an electrical charge on one of the coupled members so that if it is grounded or if an electrical circuit is completed between the two members 24 and 26 (as by contacting of metallic parts in the coupling), a spark may occur in the presence of a mixture of vaporized fuel and air to cause an explosion.

To avoid this hazardous condition the coupling of this invention is provided with at least one one-piece electrical spring metal jumper 120 (see FIGS. 1, 2, 4 and 7). Jumper 120 is formed from a suitable electrically conductive flat sided spring metal strip and has a pair of legs 122 and 124 which are integrally joined by an intermediate cross portion 126. Portion 126 has an offset section 128 which lies and is clamped between the body portion 68 of retaining band 50 and surface 58 of coupling half 41.

Figure 7:
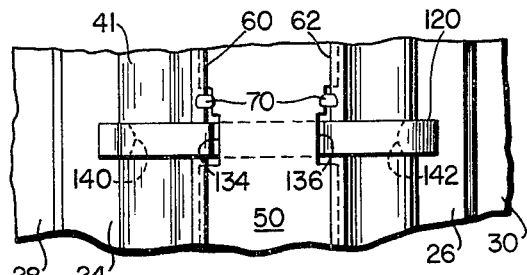
FIG. 7 is a fragmentary side elevation of the coupling as seen from lines 7—7 of FIG. 4.

As shown, the intermediate portion of jumper 120 is bent to define sections 130 and 132 which extend perpendicularly from section 128 and pass through notches 134 and 136 in body portion 68. Notches 134 and 136 are formed in the opposite side edges of body portion 68 as best shown in FIG. 7. From sections 134 and 136, jumper 120 is shaped to loop over the regions of coupling half 41 which lie between the side edges of the coupling half and surface 58.

As best shown in FIG. 4, legs 122 and 124 extend inwardly around the side edges of coupling half 41 and terminate in end portions 140 and 142. End portions 140 and 142 are reversely bent back toward coupling half 41 to lie parallel with the longitudinal axis of coupler 36.

From the foregoing description it will be appreciated that jumper 120 longitudinally straddles or bridges coupling half 41 and is retained on coupling half 41 without any fastening elements such as screws or rivets. Circumferential and axial displacement of jumper 120 along coupling half 41 is confined by engagement of the jumper with the edges of notches 134 and 136. By virtue of being captured between band 50 and the exterior surface by coupling half 41, jumper 120 is confined agaist radial movement relative to the coupling half.

When coupler 36 is assembled on sleeve 34, legs 122 and 124 are flexed to yieldably and firmly seat the reversely bent end portions of the legs against the exterior surfaces of members 24 and 26 and to thereby establish positive electrical contact with members 24 and 26. Jumper 120 therefore establishes an electrically conductive path between members 24 and 26, and since conduits 28 and 30 are in metal-to-metal contact with members 24 and 26, jumper 120 is effective to prevent a charge from building up on one conduit or the other.

Figure 11:
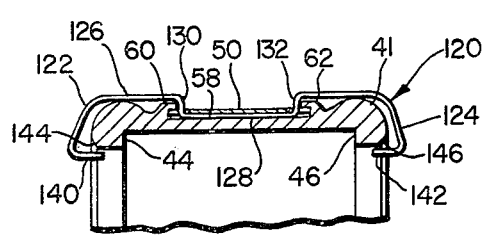
FIG. 11 is a fragmentary longitudinal section of the combined split coupler and bonding jumper assembly and illustrates the bonding jumper of this invention in its relaxed, undeflected form.

Before coupler 36 is assembled on sleeve 34, jumper 120 is in its relaxed, unflexed condition as shown in FIG. 11. In this condition, the end portions 140 and 142 of legs 122 and 124 are spaced slightly radially inwardly from shoulders 44 and 46.

When coupler 36 is assembled on sleeve 34 so that it circumferentially surrounds the adjacent regions of members 24 and 26, the end portions 140 and 142 of legs 122 and 124 seat against adjacent exterior cylindrical regions of members 24 and 26 respectively to cause legs 122 and 124 to flex outwardly as shown in FIG. 4. The flexure of legs 122 and 124 yieldably urges the extremities of end portions 140 and 142 into engagement with the axially oppositely facing side surfaces 144 and 146 on shoulders 44 and 46. Surfaces 144 and 146 are beveled or inclined inwardly so that they face both axially outwardly and radially inwardly toward members 24 and 26 respectively.

With this construction, the extremity of end portion 140 will be wedged between the exterior surface of member 24 and surface 144 when portion 140 is seated against member 24. Similarly, the extremity of end portion 142 will be wedged between the exterior surface of member 26 and surface 146 when portion 142 is seated against member 26 in the assembly.

Wedging the extremities of portions 140 and 142 against surfaces 144 and 146 makes it difficult for a person to grasp and reversely bend legs 122 and 124 outwardly and away from the coupler. This novel construction therefore inhibits tampering that could result in the permanent deformation of jumper 120. Additionally, the extremities of legs 122 and 124 cannot be grasped because they extend into annular axially outwardly recesses which are defined by the incline of surfaces 144 and 146.

From the foregoing description it will be appreciated that since jumper 120 is exteriorly mounted on coupler half 41, its presence is observable without disassembling the coupling. Additionally, jumper 120 is a permanent part of the removable split coupler assembly which is mounted on sleeve 34 and is not directly attached or secured to members 24 and 26 or to conduits 28 and 30.

Jumper 120 is therefore removable along with coupler 36 and remains secured to coupling half 41 after coupler 36 is removed to uncouple members 24 and 26. This novel construction eliminates the requirement of having to detach the jumper before uncoupling the fluid-conveying members.

Furthermore, the arrangement of jumper 120 with coupling half 41 and members 24 and 26 inhibits tampering which may lead to a permanent deformation of the jumper and breaking of the electrical circuit which the jumper completes between members 24 and 26.

Additionally, jumper 120 is not fastened or bonded in any way to members 24 and 26 or conduits 28 and 30. However, due to the flexure of legs 122 and 124, end portions 140 and 142 will remain in contact with members 24 and 26 as the coupling is flexed to angularly displace conduits 28 and 30 relative to each other.

Additional spring metal jumpers, of the same construction of jumper 120, may be mounted on coupling halves 41 and 42. For example, a second spring metal jumper 120a (see FIG. 6) is mounted on coupling half 42 in the same manner just described for jumper 120. Jumpers 120 and 120a are the same. Like reference numerals have been applied to designate like portions of jumper 120a.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A coupling assembly comprising a pair of confronting fluid-conveying members of tubular configuration, means coupling said members together and including a coupler removably circumferentially surrounding said members and limiting displacement of said members away from each other, and at least one electrically conductive spring metal jumper disposed entirely externally of said coupler and mounted on said coupler on the outer side thereof for removal therewith, said jumper having portions which seat against outer surfaces of said members to complete an electrical circuit between said members.

2. The coupling assembly defined in claim 1 wherein said jumper longitudinally straddles said coupler and has flexible spaced apart legs which terminate in said portions and which are flexed by engagement of said portions with said outer surfaces to yieldably urge said portions into seating engagement with said outer surfaces.

3. The coupling assembly defined in claim 2 wherein said coupler and said members have portions which abut to limit displacement of said members away from each other, and wherein said legs are free from attachment to said members.

4. The coupling assembly defined in claim 2 wherein said legs extend around axially oppositely facing sides of said coupler, and wherein said portions are reversely bent back toward said coupler and are wedged against axially oppositely facing said surfaces of said coupler.

5. The coupling assembly defined in claim 1 wherein said jumper straddles said coupler and has spaced apart legs extending around the axially oppositely facing sides of said coupler and terminating in said portions, said portions being reversely bent back toward said coupler and being yieldably wedged against side surfaces of said coupler.

6. The coupling assembly defined in claim 5 wherein each of said side surfaces is inclined to face both axially and inwardly toward an associated one of said fluid-conveying members.

7. The coupling assembly defined in claim 5 wherein said coupler is longitudinally divided into a pair of separately formed coupling members, and wherein a retainer assembly extending circumferentially around said coupling members releasably circumferentially confines said coupling members, said retainer assembly comprising a band extending circumferentialy along the exterior of at least one of said coupling members, and said jumper being captured between said band and the exterior of said one of said coupling members.

8. The coupling assembly defined in claim 1 wherein said jumper longitudinally straddles said coupler, is of onepiece construction, and is unattached to said members.

9. The coupling assembly defined in claim 8 wherein said coupler is longitudinally divided into a pair of separately formed coupling members which each extend partially around said fluid-conveying members, and wherein a retainer assembly extending circumferentially around said coupling members releasably circumferentially confines said coupling members, said retainer assembly comprising a band extending circumferentially along the exterior of one of said coupling members, and said jumper being captured between said band and the exterior of said one of said coupling members.

10. The coupling assembly defined in claim 1 wherein said coupler is disposed entirely between said portions of said jumper.

11. The coupling assembly defined in claim 1 wherein said coupler is longitudinally divided into a pair of separately formed coupling members, and wherein said means further comprises retainer means circumferentially surrounding said coupling members and releasably circumferentially confining said coupling members, said jumper being captured between a part of said retainer means and the exterior of one of said coupling members.

12. A coupling assembly comprising a pair of confronting fluid-conveying members of tubular configuration, means coupling said members together and including a coupler removably circumferentially surrounding said members and engageable with said members to limit displacement of said members away from each other, and at least one electrically conductive spring metal jumper disposed entirely externally of said coupler and mounted on said coupler on the outer side thereof for removal therewith, said jumper having end portions which are yieldably urged into seating engagement with outer surfaces of said members to complete an electrical circuit between said members.

13. The coupling assembly defined in claim 12 wherein said jumper longitudinally straddles said coupler, wherein said end portions are on axially oppositely facing sides of said coupler, and wherein the extremities of said end portions are yieldably wedged into engagement with axially oppositely facing side surfaces of said coupler.

14. The coupling assembly defined in claim 12 wherein said jumper completely straddles said coupler, and wherein said coupler is disposed between said end portions.

15. In combination with a pair of tubular fluid-conveying members, means comprising a coupler removably peripherally surrounding adjacent ends of said members for detachably coupling said members together and enabling limited angular displacement of said members relative to each other, and at least one electrically conductive, spring metal jumper carried on said coupler and disposed entirely externally of said coupler, said jumper being free of attachment to said members and having a pair of spaced apart legs which contact said members and which flex to maintain contact with said members as said members are angularly displaced relative to each other, and said coupler being disposed between said legs.

16. In combination with a pair of tubular fluid-conveying members, means comprising a coupler removably peripherally surrounding adjacent ends of said members for detachably coupling said members together, and at least one electrically conductive spring metal jumper mounted on said coupler on the outer side thereof for removal therewith and disposed entirely externally of said coupler, said jumper being free of attachment to said members and having portions which seat against outer surfaces of said members to complete an electrical circuit between said members.

17. In combination with a pair of tubular fluid-conveying members, means comprising a removable coupler detachably coupling said members together, and at least one electrically conductive jumper carried on said coupler for removal therewith and completely straddling said coupler on the exterior thereof, said jumper having a pair of spaced leg portions seated one against each of said members to complete an electrical circuit between said members, said coupler being disposed between said leg portions and circumferentially surrounding said members.

18. The combination defined in claim 17 wherein said coupler is longitudinally divided into a pair of separately formed coupling members, and wherein said means further comprises retainer means circumferentially surrounding said coupling members and releasably circumferentially confining said coupling members, said jumper having an intermediate portion extending between said leg portions and captured between a part of said retainer means and the exterior of one of said coupling members.

19. The combination defined in claim 17 wherein said leg portions are flexed by engagement with said members to maintain contact therewith.

20. The combination defined in claim 17 wherein said leg portions are flexed by engagement with said members and are free from attachment to said members.

21. The combination defined in claim 17 wherein said coupler and said members have portions that abut to limit displacement of said members away from each other, and wherein said leg portions are free from attachment to said members.

22. The combination defined in claim 17 wherein said leg portions extend around axially oppositely facing sides of said coupler, and wherein said leg portions terminate in ends that are reversely bent back towards said coupler and seat against outer surfaces of said members.

23. In combination with a pair of tubular fluid-conveying members, means comprising a coupler and a retainer assembly detachably coupling said fluid-conveying members together, said coupler circumferentially surrounding said fluid-conveying members and being longitudinally divided into a pair of separately formed coupling members, said retainer assembly circumferentially surrounding said coupling members and releasably circumferentially confining said coupling members, and an electrically conductive jumper completely straddling one of said coupling members and having regions in contact with said fluid-conveying members to complete an electrical circuit therebetween, said jumper having a portion extending between said regions and captured between a part of said retainer assembly and the exterior of said one of said coupling members.

* * * * *